Dec. 18, 1934.                W. BAUERSFELD                1,985,072
DEVICE FOR ILLUMINATING MICROSCOPIC OBJECTS WITH INCIDENT LIGHT
Filed April 25, 1933
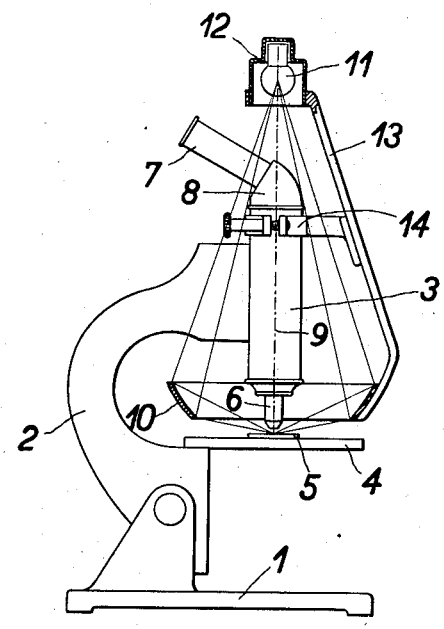
Inventor:
Walther Bauersfeld.

Patented Dec. 18, 1934

1,985,072

UNITED STATES PATENT OFFICE 1,985,072

DEVICE FOR ILLUMINATING MICROSCOPIC OBJECTS WITH INCIDENT LIGHT

Walther Bauersfeld, Jena, Germany, assignor to firm Carl Zeiss, Jena, Germany

Application April 25, 1933, Serial No. 667,776
In Germany April 30, 1932

1 Claim. (Cl. 240—2)

I have filed an application in Germany April 30, 1932.

The object of the invention is a device for illuminating microscopic objects with incident light, in which the illumination rays emitted by a source of light are directed to the object by means of a converging system concentric to the optical axis of the microscope and struck by the illumination rays, which emanate from the image side of the microscope objective. The converging system may preferably be the reflecting surface of a glass or metal mirror. In the new illumination device, this converging system is outside the microscope tube, which is enveloped by the illumination rays.

The source of light supplying the illumination rays is disposed above the microscope, in the optical axis of the objective, the converging system having a diameter which is sufficiently great to prevent the rays illuminating the object from intersecting the space occupied by the microscope tube. This arrangement, however, makes it necessary to use a microscope in which the optical axis of the eyepiece does not coincide with that of the objective. In other words, a microscope is to be applied the ocular tube of which contains a reflecting system bending the path of the imaging rays.

The accompanying drawing represents a constructional example of the invention in part-sectional elevation.

In the example, use is made of a microscope of the usual construction. This microscope consists of a base 1 supporting a pillar bracket 2 to which a microscope tube 3 is attached. To the pillar bracket 2 is fixed a stage 4 for an object 5. The microscope tube 3 has an objective 6 and an ocular tube 7. A prism housing 8 is disposed between the tube 3 and the ocular tube 7. In this prism housing 8, the optical microscope axis is bent in the known manner, this axis coinciding in all other respects with the optical axis 9 of the microscope objective 6.

An annular mirror 10 whose reflecting surface is a surface of revolution, surrounds the microscope objective 6. Above the microscope tube 3, a glowlamp 11 is disposed in the optical axis 9 of the objective 6. A holder 12 for the glowlamp 11, and the mirror 10 are fixed to a bracket 13 attached to the microscope tube 3 by means of a clamp 14. The mirror 10 is given such a size that the rays effecting the illumination of the object are outside the tube 3. The annular mirror 10 images the source of light 11, which lies in the optical axis of the microscope objective 6, on the object 5. A small part of the illumination rays is stopped down by the ocular part 7 and the upper part of the pillar bracket 2, this loss of light being of no importance whatever in the great majority of cases. The path of the illumination rays being bent in the prism housing 8, the source of light 11 does not disturb the view into the ocular tube 7.

I claim:

A device for illuminating microscopic objects with incident light, comprising a source of light disposed in the axis and on the image side of the microscope tube, an annular converging reflector disposed on the object side of the microscope tube, the reflecting surface of this reflector being a surface of revolution adapted to reflect the light incident from said source to the object being viewed, and means adapted to so dispose the said reflector concentrically to and outside the microscope tube that the cone of illumination rays emanating from the said source of light and incident on the said reflector substantially surrounds the entire length of the microscope tube.

WALTHER BAUERSFELD.